(12) United States Patent
Stephens

(10) Patent No.: US 7,505,796 B2
(45) Date of Patent: Mar. 17, 2009

(54) KEYPAD FOR PORTABLE WIRELESS DEVICES

(75) Inventor: Debra K. Stephens, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 115 days.

(21) Appl. No.: 10/905,322

(22) Filed: Dec. 28, 2004

(65) Prior Publication Data

US 2006/0142071 A1   Jun. 29, 2006

(51) Int. Cl.
*H04M 1/00* (2006.01)
(52) U.S. Cl. ............... 455/575.1; 455/575.8; 455/90.3; 455/566; 455/550.1; 345/169; 345/173; 379/433.07
(58) Field of Classification Search ............. 455/575.1, 455/556.1–2, 550.1, 90.3, 566; 379/433.07, 379/433.11; 345/168–169, 173, 157
See application file for complete search history.

(56) References Cited

U.S. PATENT DOCUMENTS

| | | | | |
|---|---|---|---|---|
| 3,911,424 A | * | 10/1975 | Giannuzzi et al. | 345/169 |
| 5,146,615 A | * | 9/1992 | Hodsdon et al. | 455/90.3 |
| 5,486,846 A | * | 1/1996 | Comer et al. | 345/168 |
| 5,523,800 A | * | 6/1996 | Dudek | 348/734 |
| 5,793,303 A | * | 8/1998 | Koga | 340/7.56 |
| 5,852,414 A | * | 12/1998 | Yu et al. | 341/22 |
| 5,861,823 A | * | 1/1999 | Strauch et al. | 341/22 |
| 5,887,995 A | * | 3/1999 | Holehan | 400/479.1 |
| 5,940,015 A | * | 8/1999 | Thornton et al. | 341/20 |
| 5,987,336 A | * | 11/1999 | Sudo et al. | 455/566 |
| 6,115,616 A | * | 9/2000 | Halperin et al. | 455/557 |
| 6,177,925 B1 | * | 1/2001 | Soloway | 345/169 |
| 6,288,708 B1 | * | 9/2001 | Stringer | 345/169 |
| 6,356,258 B1 | * | 3/2002 | Kato et al. | 345/168 |
| 6,359,572 B1 | * | 3/2002 | Vale | 341/23 |
| 6,363,264 B1 | * | 3/2002 | Overy et al. | 455/566 |
| 6,377,685 B1 | * | 4/2002 | Krishnan | 379/433.07 |
| 6,405,060 B1 | * | 6/2002 | Schroeder et al. | 455/566 |
| 6,453,170 B1 | * | 9/2002 | List et al. | 455/550.1 |
| 6,541,715 B2 | * | 4/2003 | Swanson | 200/5 A |

(Continued)

OTHER PUBLICATIONS

Sony Ericsson Mobile Communications AB, "International Patent Application PCT/US2005/021853" European Search Report, Aug. 8, 2006.

(Continued)

*Primary Examiner*—Sharad Rampuria
(74) *Attorney, Agent, or Firm*—Frederick D. Bailey; Moore & Van Allen, PLLC

(57) ABSTRACT

A keypad includes a plurality of keys that can be selectively coupled electrically with a printed circuit board to create electrical signals representative of a characters to be input to the portable wireless device. Each key further includes a plurality of contact points wherein each contact point can be separately electrically coupled with the printed circuit board to input a character associated with that contact point. The keypad can be switched between a singular mode in which all the contact points for a given key will refer to the same input character and a multiple mode in which each contact point for a given key will refer to a different input character. In addition, at least some of the contact points for each key can be programmed by the user to assign desired characters to specific contact points.

5 Claims, 5 Drawing Sheets

U.S. PATENT DOCUMENTS

| | | | |
|---|---|---|---|
| 6,563,923 B2 * | 5/2003 | Otsuka | 379/368 |
| 6,597,345 B2 * | 7/2003 | Hirshberg | 345/168 |
| 6,618,039 B1 * | 9/2003 | Grant et al. | 345/168 |
| 6,633,241 B2 * | 10/2003 | Kaikuranta et al. | 341/33 |
| 6,667,738 B2 * | 12/2003 | Murphy | 345/173 |
| 6,911,970 B2 * | 6/2005 | Wen | 345/168 |
| 6,925,315 B2 * | 8/2005 | Langford | 455/575.1 |
| 6,931,125 B2 * | 8/2005 | Smallwood | 379/433.07 |
| 6,983,175 B2 * | 1/2006 | Kwon | 455/575.1 |
| 7,014,099 B2 * | 3/2006 | Crisan | 235/60 R |
| 7,173,606 B2 * | 2/2007 | Honkala et al. | 345/169 |
| 7,302,279 B2 * | 11/2007 | Olrik et al. | 455/566 |
| 7,349,723 B2 * | 3/2008 | MacIntosh et al. | 455/575.1 |
| 7,352,363 B2 * | 4/2008 | Coates et al. | 345/169 |
| 2002/0042291 A1 * | 4/2002 | Lahteenmaki et al. | 455/566 |
| 2002/0110237 A1 | 8/2002 | Krishnan | |
| 2002/0154037 A1 * | 10/2002 | Houston | 341/21 |
| 2003/0012368 A1 | 1/2003 | Smallwood | |
| 2003/0043118 A1 * | 3/2003 | Lee | 345/168 |
| 2003/0067445 A1 * | 4/2003 | Hirshberg et al. | 345/168 |
| 2003/0121964 A1 | 7/2003 | Crisan | |
| 2004/0087333 A1 * | 5/2004 | Hutchison et al. | 455/550.1 |
| 2005/0151726 A1 * | 7/2005 | Wouters | 345/172 |
| 2005/0168447 A1 * | 8/2005 | Caine et al. | 345/169 |
| 2007/0254688 A1 * | 11/2007 | Griffin et al. | 455/550.1 |

OTHER PUBLICATIONS

Sony Ericsson Mobile Communications AB, International Application Ser. No. PCT/US05/021853, "Written Opinion", Oct. 2, 2006.

Sony Ericsson Mobile Communications AB, International Application Ser. No. PCT/US05/021853, "International Search Report", Oct. 2, 2006.

International Preliminary Report on Patentability, International Patent No. PCT/US2005/021853 dated Jul. 12, 2007.

* cited by examiner

KEYPAD FOR PORTABLE WIRELESS DEVICES

BACKGROUND

Portable wireless devices such as mobile phones have evolved into devices that transmit and receive data as well as voice information. The primary user interface for a portable wireless device is its keypad. Unfortunately a typical portable wireless device keypad can only accommodate about 12 keys.

The keypad is primarily responsible for providing an input means for numerical digits so that telephone numbers can be dialed. With expanding data and navigation capabilities, however, the typical keypad is being pressed into extra duty. Current keypad designs stamp multiple alpha-numeric characters on each key to indicate that any of these characters can be input. The primary input for each key remains its numerical value. To input one of the other characters, the user is required to press the keypad multiple times within a short time period. This has the effect of toggling through the list of characters for that particular key. The portable wireless device's display is generally used to provide visual feedback to the user as she presses a key. This allows the user to know when to stop pressing a key when the desired character has been reached.

In addition to the printed characters on each key, the portable wireless device can provide for the input of many additional characters per key using the display and a software algorithm. The additional characters include punctuation, small icons, and the like that are used in text messaging and other messaging applications.

Currently, the overall user experience for numerical and text entry is cumbersome and unsatisfactory. For a user to "type" the address and content of a text message requires significantly more keystrokes than characters used.

What is needed is a keypad that can accommodate more characters without having to resort to multiple key presses of the same key.

SUMMARY

The present invention comprises a keypad for a portable wireless device. The keypad includes a plurality of keys that can be selectively coupled electrically with a printed circuit board to create electrical signals representative of a characters to be input to the portable wireless device. Each key further includes a plurality of contact points wherein each contact point can be separately electrically coupled with the printed circuit board to input a character associated with that contact point. In another embodiment, an overlay or alternate keypad is included that can be adapted to fit over the existing plurality of keys or in place of the existing plurality of keys. The overlay or alternate keypad contains additional characters that correspond to the plurality of contact points.

The keypad can be switched between a singular mode in which all the contact points for a given key will refer to the same input character and a multiple mode in which each contact point for a given key will refer to a different input character as specified on the overlay keypad. If the overlay keypad is implemented, the act of attaching the overlay keypad over the plurality of keys switches the keypad from the singular mode to the multiple mode.

In addition, at least some of the contact points for each key can be programmed by the user to assign desired characters to specific contact points.

DETAILED DESCRIPTION

Figure 1:
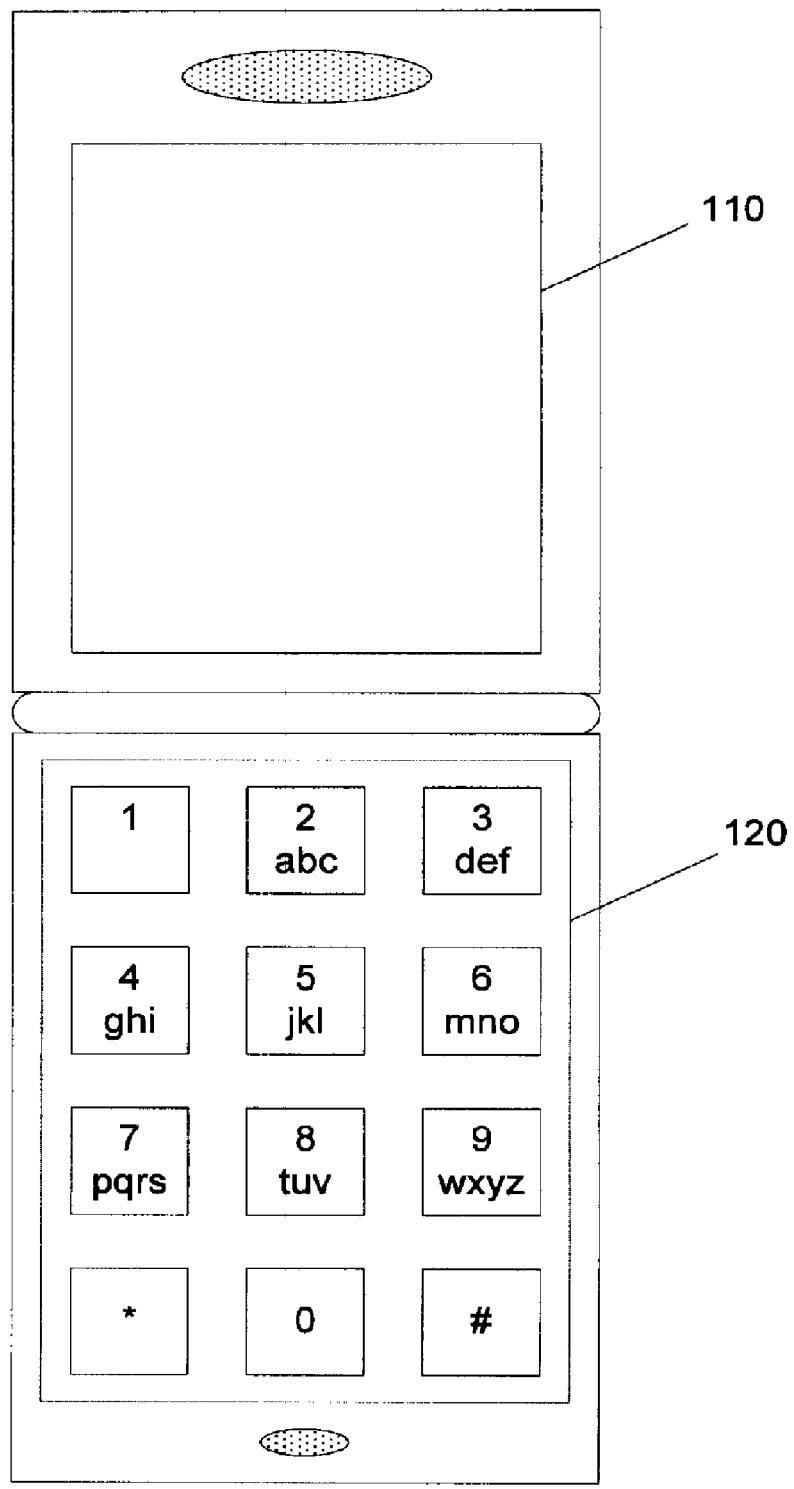
FIG. 1 is an illustration of a wireless portable device and a typical keypad.

FIG. 1 illustrates a typical portable wireless device (mobile phone in this instance) 100. This example shows a display 110 and a standard keypad 120. Keypad 120 is comprised of 12 individual keys that are labeled like a standard alpha-numeric telephone keypad. For instance, the top center key is primarily labeled "2" and has the letters "abc" underneath to indicate that these letters can be input if a particular set of keystrokes is made. In this example, each key has only one underlying electrical point of contact to a printed circuit board (or the like). Thus, to input the letter "c" it is necessary to press the key four times to cycle through the other choices before getting to the desired "c". Under this system it would take a user 18 key presses to enter the word "h-e-l-l-o" as opposed to five.

The present invention proposes dividing the keys of a keypad into multiple sections wherein each section can accommodate a distinct character. There are at least two implementations of the present invention. One is to provide an overlay (removable) keypad that can be affixed over the original keypad or in place of the original keypad on the portable wireless device by the user when additional characters are desired.

Another implementation integrates the characters into the primary keypad. In either case, the components comprising the keypad that help convert user input (a key press) to an electrical signal must provide separate contact points to an underlying printed circuit board (PCB). This allows the circuitry to distinguish the user's intent when pressing a key.

Figure 2:
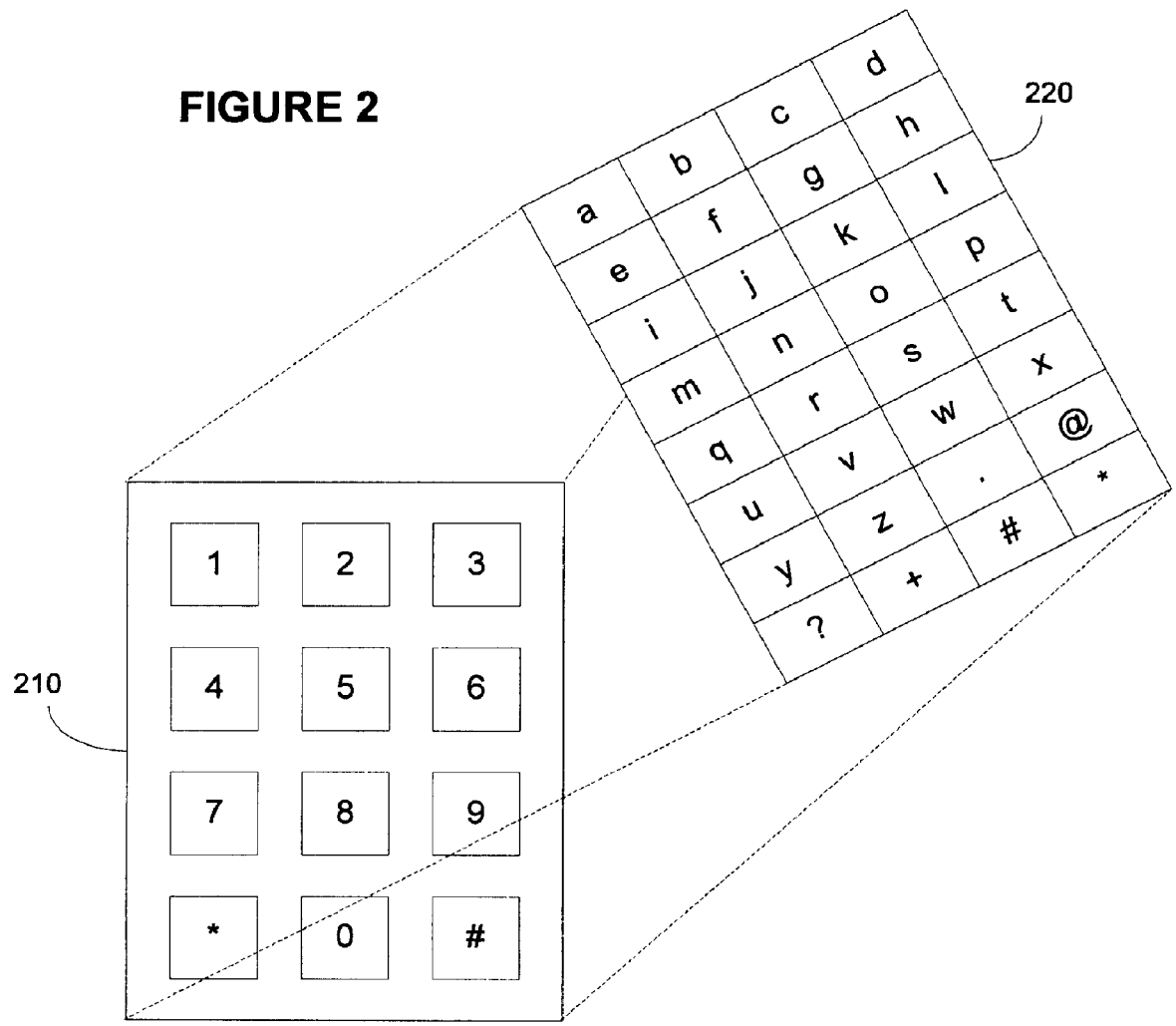
FIG. 2 is an illustration of a standard keypad and an overlay keypad that is sectioned to accommodate additional characters.

FIG. 2 illustrates a standard keypad 210 and an overlay keypad 220 that is sectioned to accommodate additional characters as compared to the standard keypad 210. The overlay keypad 220 shown here is partitioned into 32 keys, 20 more than a standard keypad.

Each key on the overlay or alternate keypad has its own electrical contact to the PCB within the portable wireless device. When a key is pressed it electrically couples with a PCB or the like to create an electrical signal representative of the character associated with the key. One implementation has the overlay keypad comprised of a semi-rigid material that has numbers, letters, or characters printed on each key in the area that corresponds to a key press. The user snaps the overlay keypad into place over the standard keypad. The action of snapping the keypad into place can also serve as the trigger that activates the alternate contact points for each key such that each contact point is now associated with its printed character on the overlay keypad. In other words, when the overlay keypad is fit over the standard keypad, the contact points associated with the overlay keypad become active while the contact points for the standard keypad are made inactive.

Figure 3:
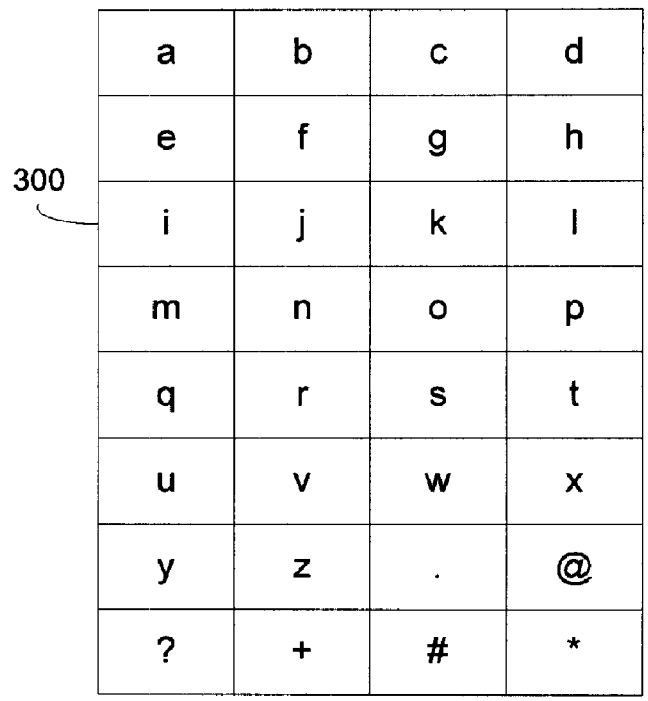
FIG. 3 is an illustration of an alternate keypad that can be used in place of a removable standard keypad.

FIG. 3 is an illustration of an alternate keypad 300 that can be used in place of a removable standard keypad. In this embodiment, the standard keypad 210 is removable. Once removed, an alternate keypad 300 that accommodates many additional characters can be set in place. The alternate keypad will have the same overall dimensions as the standard keypad but will take advantage of all or nearly all of the surface space to provide for additional characters. After snapping an alternate keypad into place, the user can use a menu function and navigate the portable wireless device to associate the new keypad with a contact point mapping stored in the portable wireless device. The portable wireless device can store multiple contact point mappings to accommodate multiple alternate keypads.

Figure 4:
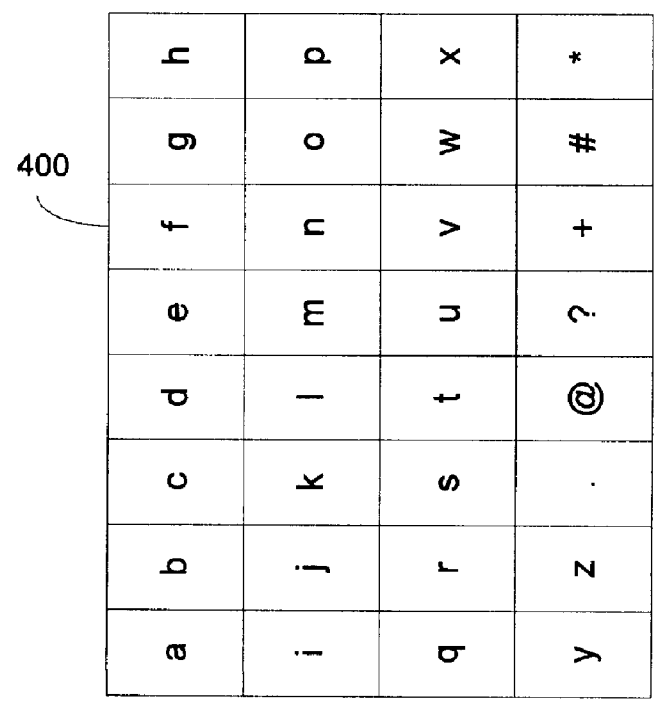
FIG. 4 is an illustration of an alternate keypad showing an alternate orientation.

FIG. 4 is an illustration of an alternate keypad showing an alternate orientation. An alternate keypad 400 can also be oriented differently than the standard keypad. For instance, it may be more intuitive for a user to use an alpha keypad that is organized has a 4×8 table rather than an 8×4 (i.e., more of a landscape effect as opposed to portrait).

Figure 5:
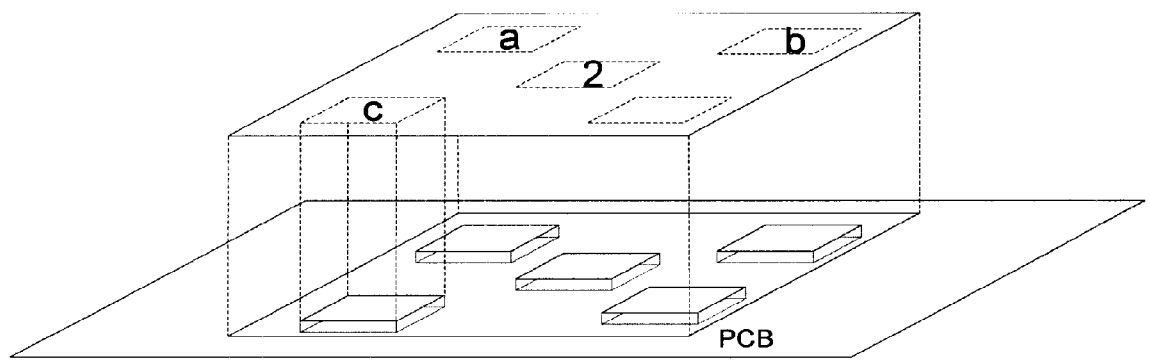
FIG. 5 is an illustration of a key on a keypad showing contact points for each section.
Figure 6:
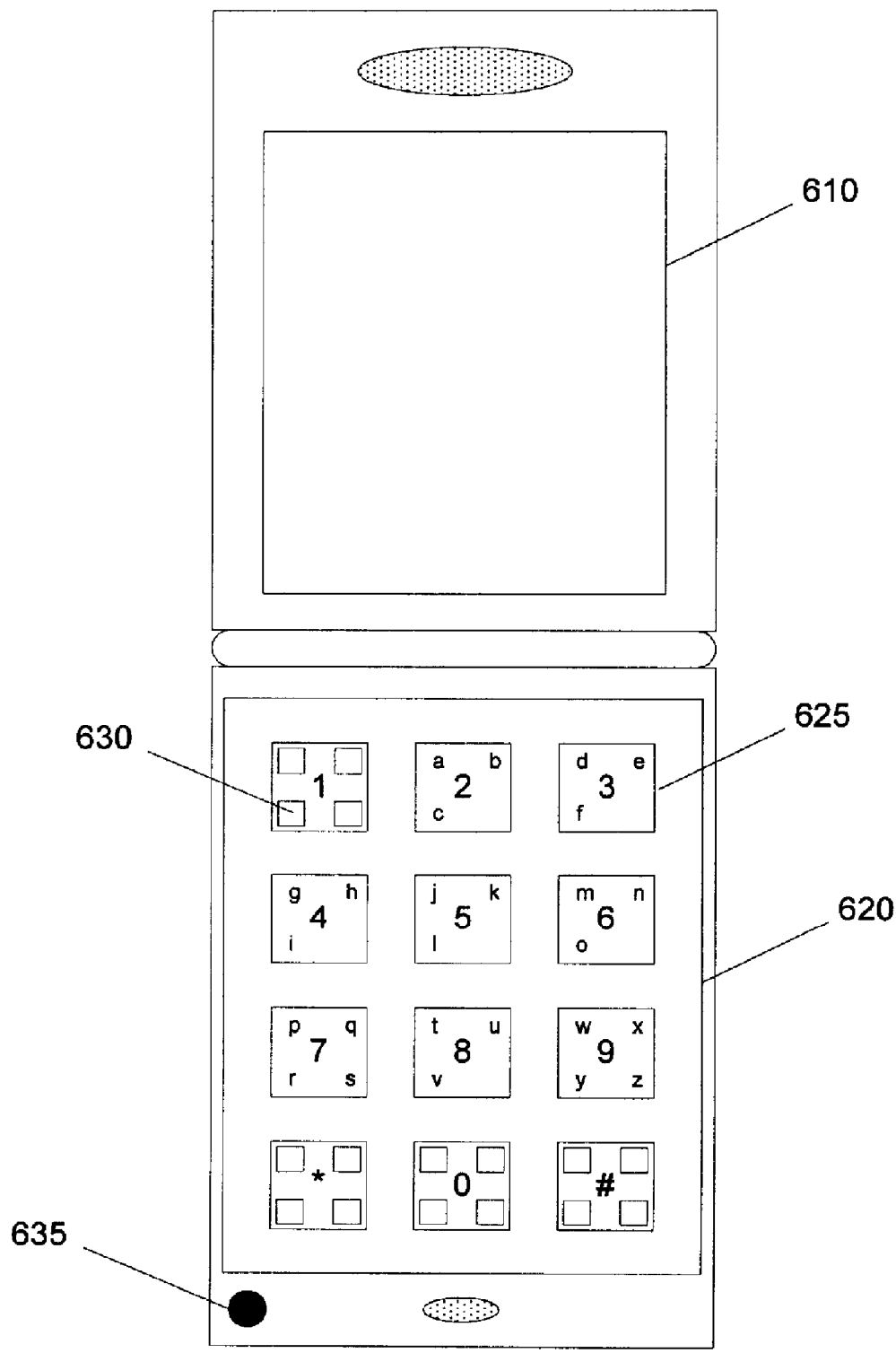
FIG. 6 is an illustration of a wireless portable device and a keypad that is sectioned to accommodate multiple characters per key.

Yet another embodiment integrates additional characters into the primary keypad. FIGS. 5 and 6 herein illustrate individual keys as rectangular. Each key is sectioned into five distinct areas, the four corners and the center. Each corner corresponds to a secondary character such as a letter of the alphabet or other symbol or icon while the center section is reserved for its typical numerical value.

FIG. 5 is a cross-sectional perspective illustration of a key on a keypad showing contact points for each section. The top of the key (whether an overlay or integrated) is imprinted with up to four characters in each corner as well as a numerical value in the center. When the user applies pressure to any one of these areas that part of the key is designed to descend toward the PCB ahead of the areas not experiencing as much direct pressure. This will cause the contact point associated with that section to electrically connect with the PCB. This contact point has been "programmed" to be associated with a particular character which will be shown on the portable wireless device's display.

FIG. 6 is an illustration of a wireless portable device 600 and integrated keypad 620 that is sectioned to accommodate multiple characters per key. The keypad 620 has been shown imprinted with numeric characters in their traditional locations. In addition, English alphabetic characters have been imprinted in the various corners of the keys 625. Since the alphabet contains fewer letters than spaces available there are many blank locations remaining. These remaining locations can be programmed to be associated with punctuation marks, icons, symbols, or even shortcut function keys. The surface of the keypad 620 itself can be comprised of a material that allows a user to draw or write a chosen symbol. This provides a visual cue so the user need not remember what character is programmed in each blank space 630.

There may be many times that the user does not need the additional characters such as when dialing a numeric telephone number. To give the user another degree of flexibility, the keypad can be set to singular mode or to multiple mode. Singular mode causes a key press to initiate an electrical signal indicative of the numeric value (or center value) on the key regardless of what section of the key has been pressed. Singular mode causes all contacts associated with that key to default to the numeric value (center labeled value) associated with the key. This ensures quick and accurate user input when only numbers are required.

Multiple mode, however, causes each contact on each key to initiate a different electrical signal based on that key's definition. Multiple mode is most useful when the user input requires text or other characters in addition to numerical input.

Switching between singular mode and multiple mode can be achieved through a menu selection or a hard wired "hot" key 635 placed somewhere on the portable wireless device 600.

As the figures have shown, each key can accommodate up to four additional characters that can be input with a single key press. A typical numeric keypad is comprised of 12 keys, one for each digit 0-9 and separate keys for the "*" and "#" characters. Thus, there is room for 48 additional characters. The English alphabet is made up of 26 characters leaving 22 potential programmable locations that can be filled with additional characters such as punctuation marks, symbols, or icons. Other languages may have more or less than 26 characters leaving more or less potentially blank locations. In order to fill these locations, the user can be allowed to program certain locations with characters (or even shortcut functions) of their choice. Often, there are more than the standard 12 keys that make up a keypad. These additional keys (sometimes referred to as function keys) can also be sectioned to increase the number of inputs available for a single key press.

The design, layout, order, or sequencing of the keys on the keypad or the characters on the keys is considered a design choice. Thus, the illustration of a keypad that resembles a standard telephone keypad and the sectioning of each key into four corners and a center area is merely exemplary.

In addition, the design, layout, order, or sequencing of the keys on alternate keypads is also flexible. There can be multiple alternate keypads that have different character arrangements. With multiple alternate keypads, a user can choose a keypad for a particular purpose including different languages or character sets.

One of ordinary skill in the art can readily adapt the teachings of the present invention to accommodate other keypad designs and individual key designs.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

What is claimed is:

1. An overlay keypad that fits over a standard keypad on a portable wireless device, the overlay keypad comprising:
   a plurality of keys, each key of the plurality of keys comprising a plurality of contact points that can be selectively coupled with a plurality of contact points on a printed circuit board within the portable wireless device to input a character associated with that contact point/key pairing such that when the overlay keypad is fit over the standard keypad, the contact points for each key associated with the overlay keypad become active while the contact point for each key for the standard keypad are made inactive, wherein at least some of the contact points for each key can be programmed to assign desired characters to specific contact points.

2. An alternate keypad that can replace a removable standard keypad on a portable wireless device, the alternate keypad comprising:

a plurality of keys, each key of the plurality of keys comprising a plurality of contact points that can be selectively coupled with a plurality of contact points per key on a printed circuit board within the portable wireless device to input a character associated with that contact point/key pairing such that when the alternate keypad is fit over the standard keypad, the contact points for each key associated with the alternate keypad become active while the contact point for each key for the standard keypad are made inactive, wherein at least some of the contact points for each key can be programmed to assign desired characters to specific contact points.

3. A portable wireless device comprising:

a removable standard keypad having a first plurality of keys wherein each key is associated with a single contact point;

a removable alternate keypad having a second plurality of keys wherein each key is associated with a plurality of contact points;

a printed circuit board having a plurality of contact points that can form an electrical signal when brought into contact with a single contact point from a key of the first plurality of keys or a plurality of contact points from a key of the second plurality of keys;

such that when the alternate keypad is used in place of the standard keypad, the contact points associated with the alternate keypad become active while the contact points for the standard keypad are made inactive.

4. The portable wireless device of claim 3 wherein there are multiple alternate keypads each having a different character mapping.

5. The portable wireless device of claim 4 wherein a character mapping for a particular alternate keypad is in memory within the portable wireless device and can be activated when that particular alternate keypad is attached to the portable wireless device.

\* \* \* \* \*